United States Patent [19]
Korthout et al.

[11] Patent Number: 5,896,172
[45] Date of Patent: Apr. 20, 1999

[54] METHOD OF OPERATING A CCD IMAGER SUITABLE FOR THE IMPLEMENTATION OF SUCH A METHOD

[75] Inventors: Alouisius W. M. Korthout; Hendrik Heijns, both of Eindhoven, Netherlands

[73] Assignee: U.S. Philips Corporation, New York, N.Y.

[21] Appl. No.: 08/673,782

[22] Filed: Jun. 20, 1996

[30] Foreign Application Priority Data

Jun. 23, 1995 [EP]  European Pat. Off. .............. 95201715

[51] Int. Cl.[6] ................................................. H04N 3/14
[52] U.S. Cl. ........................ 348/248; 348/249; 348/312
[58] Field of Search .............................. 348/248, 249, 348/311, 312, 316, 322, 323

[56]     References Cited

U.S. PATENT DOCUMENTS 4,951,148   8/1990   Esser et al. ...................... 358/213.18

FOREIGN PATENT DOCUMENTS 0113627   7/1984   European Pat. Off. .

OTHER PUBLICATIONS

"Tektronics Four Quadrant Readout 1024 ×1024 CCD Imager: First Test Results", by Delamere et al., Optical Sensors and Electronic Photography, published in SPIE vol. 1071, 1989, pp. 197–202.

*Primary Examiner*—Wendy Garber
*Assistant Examiner*—Ngoc-yen Vu
*Attorney, Agent, or Firm*—Steven R. Biren

[57]     ABSTRACT

The absence of a memory matrix in full frame CCD imagers renders it difficult to convert an image with a sufficiently high frame rate for displaying it again in a satisfactory manner on, for example, an LCD screen. To eliminate this disadvantage, an image is projected on a segment of the imaging matrix in an embodiment of the invention and, after the integration period, is stored in an adjoining, separately controllable segment which is used as a memory during the read-out while in the first segment a fresh image is received and converted into electric charge. During the transfer of the information from the first to the second segment, empty lines are formed between the lines containing information, in which empty lines compensation charge is formed during the charge storage which can be subtracted from the signals so as to compensate for the smear added to the signals during storage in the—exposed—second segment. The total number of lines can be limited in that signal lines are joined together or signal lines are drained off through the substrate. In a second embodiment, the charge pattern of the second segment may be transported back to the first segment again, which is used as a memory, while an image is received by the second segment. It is possible in this manner to convert and display a full frame with a comparatively high frequency.

21 Claims, 4 Drawing Sheets

METHOD OF OPERATING A CCD IMAGER SUITABLE FOR THE IMPLEMENTATION OF SUCH A METHOD

BACKGROUND OF THE INVENTION

The invention relates to a method of operating a CCD imager with a semiconductor body comprising a matrix of photosensitive elements arranged in rows and columns, and a system of CCD channels which extend in the matrix in the column direction and at at least one of the ends merge into a read-out register which extends adjacent the matrix parallel to the rows of the matrix, the matrix being divided at least in the column direction into two at least substantially equal segments which are each provided with a separately controllable system of electrodes for storing and transporting charge packets in said CCD channels.

The invention also relates to a CCD imager with a semiconductor body comprising a matrix of photosensitive elements arranged in rows and columns, and a system of CCD channels which extend in the matrix in the column direction and at at least one of the ends merge into a read-out register which extends adjacent the matrix parallel to the rows of the matrix, the matrix being divided at least in the column direction into two at least substantially equal segments which are each provided with a separately controllable system of electrodes for storing and transporting charge packets in said CCD channels.

Such a CCD imager and a method of operating said imager are known, for example, from the article "Tektronics Four Quadrant Readout 1024×1024 CCD Imager: First Test Results" by Delamere et al., published in SPIE Vol. 1071, Optical Sensors and Electronic Photography (1989) pp. 197–202. A "Full Frame" imager is described therein where the number of image elements or pixels corresponds to the number of image elements of a complete image. The matrix is provided with a horizontal read-out register on either side of the CCD channels so as to be able to read out such a large imager sufficiently quickly. The matrix is subdivided into two halves which each belong to one of the read-out registers, while each matrix half can be read out through the associated horizontal register. Each horizontal register in its turn may again comprise two parts with mutually opposed charge transport directions, each corresponding again to an adjoining quadrant of the matrix. Such constructions have the advantage that two halves or four quadrants of the matrix can be read out simultaneously instead of consecutively. As a result, the read-out time can be limited, also in the case of a very large imager with a very large number of pixels, as is often the case in a "Full Frame" imager. Although the matrix is subdivided into four quadrants, each having a separate read-out register, in most versions of a "Full Frame" imager, the present invention is not limited thereto, but it may also be applied to "Full Frame" imagers having a read-out register at one side of the matrix only, as will become apparent below.

Imagers of the kind described above differ from better known CCD imagers, known inter alia as imagers of the FT-type (Frame Transfer) or of the interline type, which are designed for recording or displaying moving images, through the absence of a memory section. For such applications, the imager is provided with a recording section and a memory section. In these known types, an image is recorded in the recording section and converted into a pattern of charge packets during a certain integration period. This pattern of charge packets is quickly moved into the memory section after the integration period and read out therein packet by packet. Since the memory section is screened from radiation, the change of the charge packets owing to absorption of radiation during read-out, often referred to as "smear", is very small. During read-out, an image can be taken up in the recording section again and converted into electric charges. The presence of the memory section renders it possible inter alia to record such a high number of images per unit time and convert them into electric charges that the video signals of moving images can be displayed on a TV screen or LCD screen, for example, as real-time pictures.

SUMMARY OF THE INVENTION

The invention has for its object inter alia to operate a CCD imager of the kind described in the opening paragraph such that moving images can be converted in the imager with a comparatively high image frequency and can thus be satisfactorily displayed in a display system such as a TV or LCD.

The invention is based inter alia on the recognition that only part of the image need be converted in a number of cases, for which only part of the recording matrix is necessary, while another part of the matrix not used for the conversion of the image may be temporarily used as a memory. The invention is further based on the recognition that the use of the recording matrix or at least part thereof as a memory adds smear charge to the charge packets which can be compensated in a simple manner during the read-out.

According to the invention, a method of the kind described in the opening paragraph is characterized in that during an integration period an electromagnetic image is captured and converted into electric charge by one of said segments of the matrix, called first matrix segment, and in that after the integration period said charge is transported to the other segment of the matrix, called second matrix segment, which is temporarily used as a memory in which the electric charge is stored in the form of charge packets before being read out row by row through a read-out register, while at least one additional row of charge packets is formed containing exclusively electric charge integrated during the charge transport from the transition between the first and the second matrix segment to the transition to said read-out register with the object of reducing each of said former charge packets by a quantity of charge which serves as a compensation for the smear charge captured after the integration period, an empty row being formed for the formation of this additional row through the transport of charge into the second matrix segment over a distance of one row while the charge in the first matrix segment is not transported further. When this method is used, an image can be recorded in a matrix segment again while the other matrix segment is being used as a memory. The number of images to be recorded per unit time may thus be considerably increased, so that also moving pictures can be represented satisfactorily. Since the portion of the matrix used as a memory is not masked against radiation, additional charge called smear charge may be added to the signals during the storage in the memory. As will become apparent from the ensuing description of the Figures, a smear compensation line may readily be formed between consecutive lines at the boundary between the two matrix segments in that the electrodes of the two matrix segments are separately controlled. This line is formed through the formation of an extra line of potential wells between two lines in that first the second segment only is clocked and the first segment is made idle, and subsequently said extra line is transported together with the lines containing the video information. Charge packets are formed in the empty potential wells during this transport as a result of absorption of electromagnetic radiation. The value of these charge packets is equal or at least substantially equal to the smear charge received by the charge packets representing the video information, and may thus be used for compensating this smear charge during readout.

It is necessary to reduce the number of signal lines so as to prevent the number of lines from becoming greater than can be stored in the second segment. A first embodiment in which the number of lines can be kept limited and which has the advantage inter alia of a comparatively high MTF (Modulation Transfer Function), is characterized in that charge packets in a row of charge packets generated during the integration period in the first matrix segment are removed through a charge drain during the transport from the first matrix segment to the second matrix segment. Said charge drain may then also be used for removing excess charge formed by overexposure and thus preventing this charge from spreading over several pixels (anti-blooming). A substrate may be used for the charge drain, for example, of the same conductivity type as the charge transport channels, separated therefrom by an interposed layer of the opposed conductivity type.

A second embodiment of a method according to the invention by means of which the total number of lines can be limited and which in addition to the possible advantage of fewer detrimental Moiré effects has the advantage that it can also be used when there are no anti-blooming means, is characterized in that, before an empty row is formed at the transition between the first and the second matrix segment, at least two consecutive rows of charge packets formed in the first matrix segment during said integration period are added together. This embodiment has the additional advantage of a higher sensitivity since no generated charge is removed.

Another embodiment of a method according to the invention is characterized in that the rows of charge packets are read out row by row by the read-out register belonging to the second matrix segment after having been transported from the first matrix segment into the second matrix segment, while a fresh electromagnetic image is received in the first matrix segment and is converted into electric charge. The images may be received in the first matrix half at a comparatively high frequency and be displayed by an image display system. This embodiment may be used to advantage in those cases where only part of the total image need be displayed. Another embodiment, which has the advantage of displaying a total image on a TV or LCD screen, is characterized in that, a matrix being used with a read-out register at both ends, the rows of charge packets, after being transported from the first matrix segment into the second matrix segment, are transported to the first matrix segment together with the additional rows formed and are read out row by row from the first matrix segment by the associated read-out register, while an electromagnetic image is received in the second matrix segment and converted into a pattern of electric charges. A preferred embodiment of this, which renders it possible to display a sufficiently high number of images per unit time, is characterized in that during the charge transport from the first matrix segment into the second matrix segment the number of rows containing video information is reduced such that the resulting total number of rows of charge packets stored in the first matrix segment is smaller than the total number of rows containing video information formed in the first matrix segment during the integration period.

During charge transport, smear charges may be added to the charge packets of such a value that the total quantity of charge becomes greater than the maximum quantity of charge which can be stored per charge packet. When this total quantity is reduced by the smear charge quantity, useful information may be lost because the smear component in the saturated charge packet (=signal+smear) may be smaller than the smear signal in the additional row. An embodiment of a method according to the invention in which this disadvantage is considerably reduced is characterized in that different voltages are applied to the electrodes below which charge is stored after the integration period and during the integration period, such that a greater charge packet can be stored below these electrodes after the integration period than during the integration period. In another embodiment, the quantity of signal charge integrated during the integration period may be reduced, for example through a reduction in the sensitivity. This may be achieved through a reduction in the number of electrodes per pixel below which charge is integrated, for example to one or two electrodes in a 4-phase system, while the other electrodes are at a voltage at which a potential barrier is formed in the semiconductor body.

According to the invention, a CCD imager as described in the second paragraph is characterized in that means are present for receiving an electromagnetic image during an integration period and converting it into electric charge by means of one of said segments of the matrix, called first matrix segment, and for transporting this charge to the other segment of the matrix, called second matrix segment, after the integration period, which second matrix segment is temporarily used as a memory in which the electric charge is stored in the form of charge packets before being read out row by row by a read-out register, while furthermore means are present for subtracting from each of these charge packets a quantity of charge by way of compensation for the smear charge captured after the integration period, for forming at least one additional row of charge packets which contains exclusively electric charge integrated during the charge transport from the transition between the first and the second matrix segment to the transition to said read-out register, and for forming an empty row for the formation of this additional row through the transport of charge in the second matrix segment over a distance of one row while the charge in the first matrix segment is not transported further.

BRIEF DESCRIPTION OF THE DRAWINGS

These and other aspects of the invention will be explained in more detail with reference to several embodiments. In the drawing.

DESCRIPTION OF THE PREFERRED EMBODIMENTS

Figure 1:
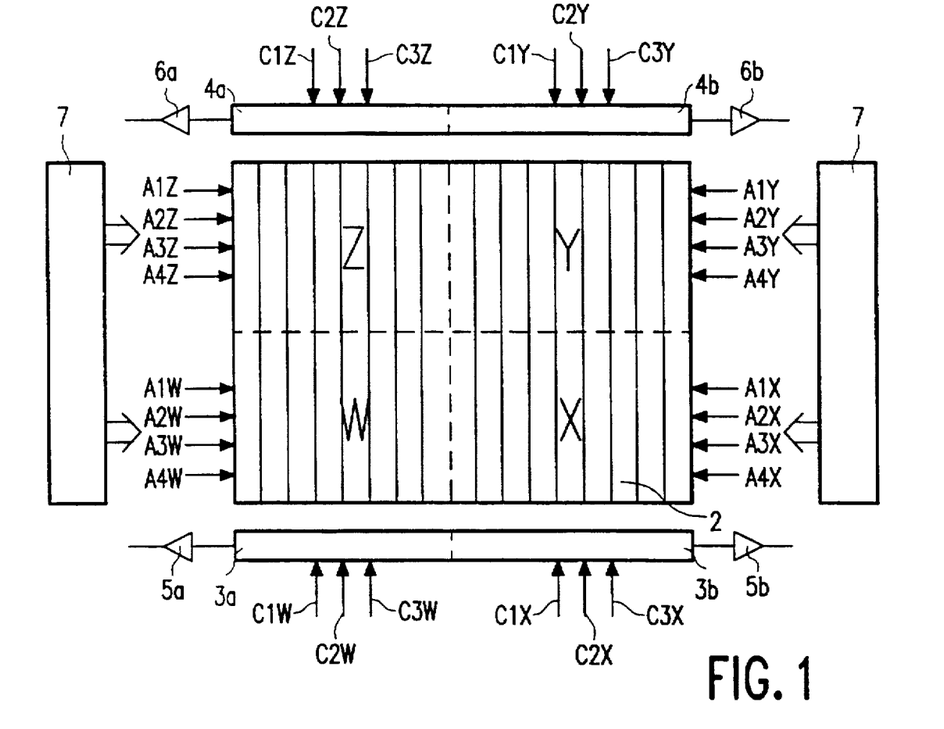
FIG. 1 is a diagram of a four-quadrant CCD imager.

FIG. 1 is a diagram of a "Full Frame" CCD imager, in this case a four-quadrant imager, formed by a matrix 1 of photosensitive elements arranged in row and columns. The matrix comprises a system of CCD channels 2 which extend in vertical direction in the drawing and in this case form the photosensitive elements in which electromagnetic radiation is converted into packets of electric charge. In alternative embodiments, photodiodes may be used for the conversion of light, while the CCD channels are mainly used for charge storage or charge transport in a manner analogous to that in image sensors of the interline type. The drawing shows only a few columns; in actual fact the number will obviously be much greater, for example, approximately $3.10^3$ in a special embodiment with approximately $2.10^3$ lines in vertical direction. Horizontal read-out registers 3 and 4 are provided at the ends on either side of the matrix 1 in order to read out this large number of pixels within a limited period. Said registers each comprise a portion a in which signals can be transported to the left to an output amplifier 5a 6a, and a portion b in which the signals can be transported to the right to an output amplifier 5b 6b. The matrix 1 comprises four quadrants indicated with the symbols W, X, Y, Z in FIG. 1. The boundaries between the various quadrants are indicated with broken lines in the drawing.

The control of the device may be such that the matrix can be read out in various ways as desired. According to a first option, the quadrants W, X, Y, Z may be read out in parallel via respective amplifiers 5a, 5b, 6b, 6a. In an alternative mode of operation, the quadrants W and X are both read out through output 5a (or 5b) and the quadrants Y and Z via the output 6a (or 6b). It may also be advantageous under certain circumstances to read out the entire matrix 1 through a single output.

The matrix 1 is provided with a system of clock electrodes which is designed such that the electrodes of the lower half of the matrix, i.e. of the quadrants W and X, can be controlled independently of the electrodes of the upper half, i.e. of the quadrants Z and Y. In the drawing, where a four-phase system is shown by way of example, the clock electrodes are indicated diagrammatically with arrows. Thus, for example, the electrodes of quadrant W are indicated with arrows A1W, A2W, A3W, and A4W which represent phase 1, phase 2, phase 3 and phase 4, respectively. It is noted in this connection that the quadrants W and X are provided with separate systems of electrodes, as are the quadrants Z and Y. In many cases, however, it is alternatively possible to provide the quadrants W and X with a common system of electrodes, and also the quadrants Z and Y.

The horizontal read-out registers 3 and 4 are three-phase CCDs in this example. The electrodes are again diagrammatically indicated with arrows, the electrodes of output register 3a being indicated with, for example, C1W, C2W and C3W, and the electrodes of quadrant Y with C1W, C2W and C3W. Obviously, it is also possible to use, for example, four-phase CCDs for the horizontal registers.

FIG. 1 further shows the clock signal generator 7, which is diagrammatically represented by the blocks 7 on either side of the matrix 1 and which generates the clock signals applied to the electrodes of the matrix. Such a clock signal generator is also present for the horizontal read-out registers 3 and 4, but it is not shown in the drawing so as not to render the latter unnecessarily complicated.

Figure 2:
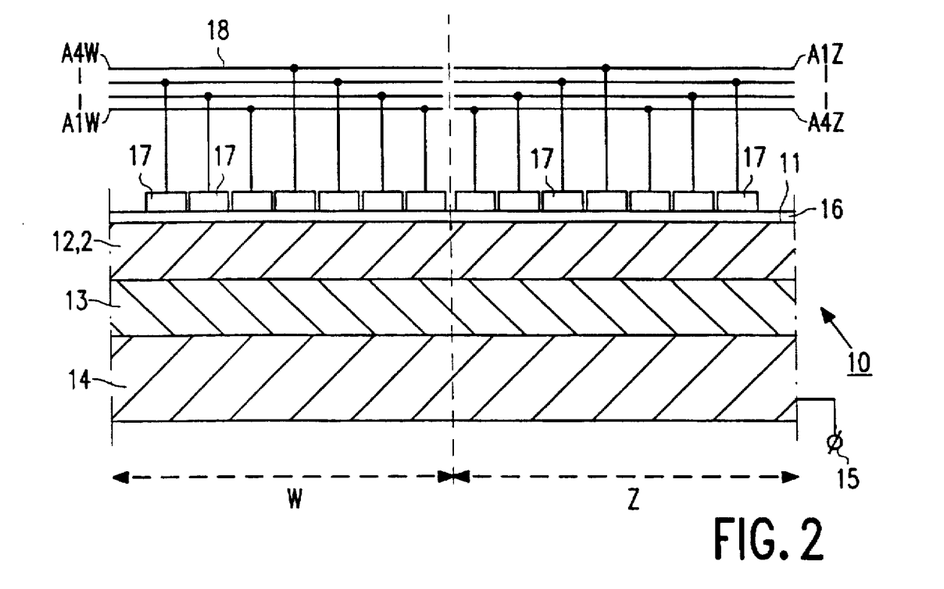
FIG. 2 is a cross-section of the device of FIG. 1.

FIG. 2 is a cross-section through the matrix parallel to the column direction along a portion of a CCD channel 2, which portion extends partly in quadrant W and partly in quadrant Z. The charge coupled device is of the buried channel type, in this example with an n-type channel, and comprises a semiconductor body 10 of silicon with an npn layer structure which extends from the surface 11 in downward direction. This layer stack comprises a thin n-type layer 12 which is situated at or adjacent the surface and forms a charge transport channel, and is accordingly given the reference 12.2 in FIG. 2. This layer merges at the lower side into a comparatively thin p-type layer 13 which separates the layer 12 from the n-type bottom layer 14. The npn configuration described here is usual for, for example, "Frame Transfer" imagers in which the upper n-type layer forms the buried channel, the interposed p-type layer a barrier layer for electrodes, and the n-type layer 14 a drain for excess electrons from the layer 12. The barrier in the p-type layer 13 is so chosen or so adjusted that the excess charge caused by local overexposure can drain off through the p-type layer 13 into the layer 14, which is also called substrate, without spreading over the CCD register (anti-blooming). It is also possible to remove all charge from the layer 12.2 by means of a voltage pulse (charge reset). The substrate 14 is provided with a connection terminal 15 by means of which the desired voltage can be applied to the substrate.

The surface 11 is covered with a gate dielectric, in this case a silicon oxide layer 16 of usual thickness. The gate electrodes are provided thereon in the form of conductor tracks 17 which extend in horizontal direction in FIG. 1 and transversely to the plane of drawing in the cross-section of FIG. 2. The electrodes 17 are drawn as conductors situated next to one another in FIG. 2 for the sake of clarity. In actual fact, however, the electrodes may obviously be provided in a usual overlapping manner in a multilayer wiring. The electrodes are connected in usual manner to clock lines 18 through which the clock voltages are supplied. Typical 4-phase clock voltages 20, 21, 22 and 23 are plotted as a function of time t in FIG. 3. It is noted that the direction of charge transport is determined by the choice of time sequence in which these clock voltages are applied to the various groups of electrodes. If, for example, the clock voltages 20–23 are applied to the electrodes A1W–A4W, respectively, the charge transport will take place from top to bottom in quadrant W to the horizontal register 3a. If, on the other hand, the clock voltages 20–23 are applied to the electrodes A4W–A1W, respectively, the charge packets in quadrant W will be transported from bottom to top. As will become apparent below, this possibility of choosing the transport direction will be utilized in the operation of the imager.

Figure 4:
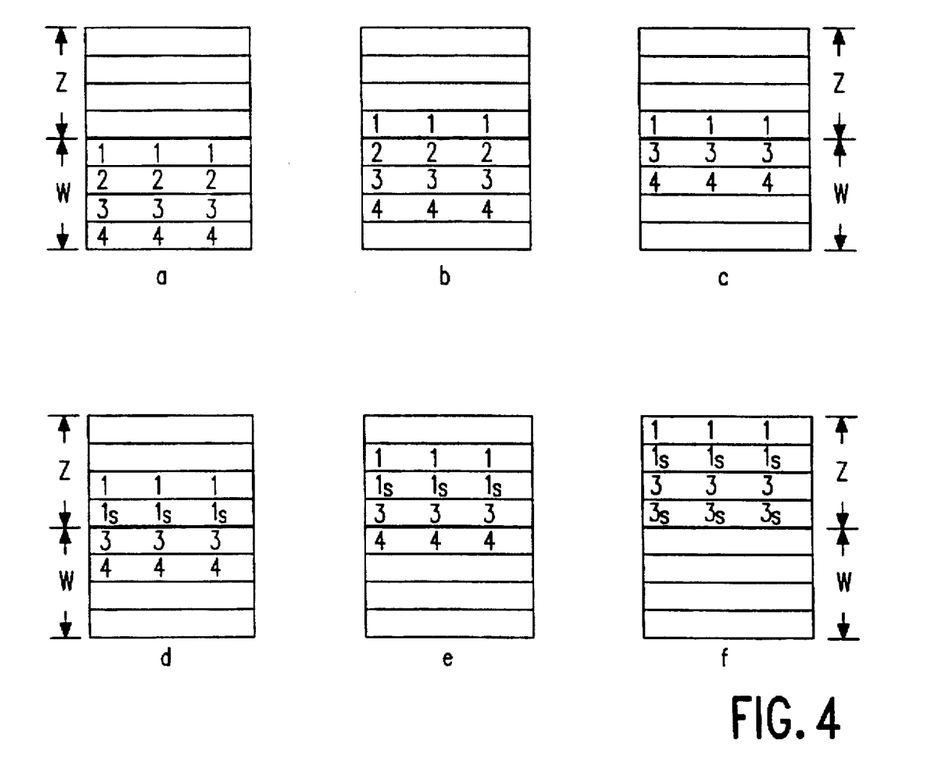
FIG. 4 diagrammatically shows a method according to the invention for operating the device as shown in FIGS. 1 and 2.

In a normal operating mode, an image is projected onto the imager WXYZ during a certain exposure time, after which the pattern of charge packets thus formed is read out through one or several of the horizontal read-out registers. During this read-out, the imager 1 can be screened from radiation by means of a shutter not shown in the drawing. The read-out information may be stored, for example, in a memory or may be processed by some other method known per se. When all information has been read out, the imager can be made ready for receiving a fresh image. An operating mode will be described below with reference to FIG. 4 in which a greater number of images can be received per unit time than in the mode described above and in which a picture can be displayed on a standard screen such as an LCD. The use of a shutter is not practicable in such situations owing to the high frequency. For simplicity's sake, FIG. 4 only shows the quadrants W and Z, and of these quadrants only four lines on either side of the boundary between these quadrants. The method is based on the fact that the quadrant W (or the quadrants W and X) is used as the imager and the quadrant Z (or the quadrants Z and W)

as the memory. FIG. 4a shows the situation at the end of an integration period, when a pattern of charges has been formed in segment W corresponding to an image received. The consecutive lines are denoted with the symbols "1", "2", "3" and "4". Charge possibly present in segment Z is not relevant, this is why this segment is presumed to be empty. In a first step, the segments W and Z are both clocked simultaneously and in the same direction, so that all lines in W are shifted over a distance of one line in the direction of Z, and line "1" is stored in Z, see FIG. 4b. In a next stage, the clock voltages of Z are stopped while the lines in W are transported further over a distance of one line. Stopping of the clock of Z renders it impossible for the charge packets of line "2" to go any further, so that they are drained off through the substrate 14 (FIG. 4c). Then the clock voltages of W are stopped and the electrodes of Z are clocked, so that the line "1" is shifted over a distance of one line in Z. Since line "3" is not displaced, an empty line remains where line "1" had been stored, i.e. a line containing no video information. Since the matrix is not screened from radiation by a shutter in this operating mode, radiation is absorbed in segment Z and converted into charge. Charge is thus also added to the charge packets of line "1" during the entire charge storage and transport time in segment Z. This added charge is called "smear" hereinafter. The smear present in the empty line formed, called "1s" hereinafter, will be used to compensate for the smear of the signals in line "1", see FIG. 4d. The process described is then repeated, segments W and Z being both clocked, so that the lines "1" and "1s" are transported further over a distance of one line in segment Z, and line "3" is displaced from segment W into segment Z, see FIG. 4e. The clock voltages of Z are stopped again, so that line "4" is drained off to the substrate. When the pattern in Z has been shifted again over a distance of one line, the situation as shown in FIG. 4f is obtained where the signal lines "1" and "3" are stored in segment Z together with two smear lines "1s" and "3s". Segment W is empty again and may accordingly be used for receiving an image.

Figure 3:
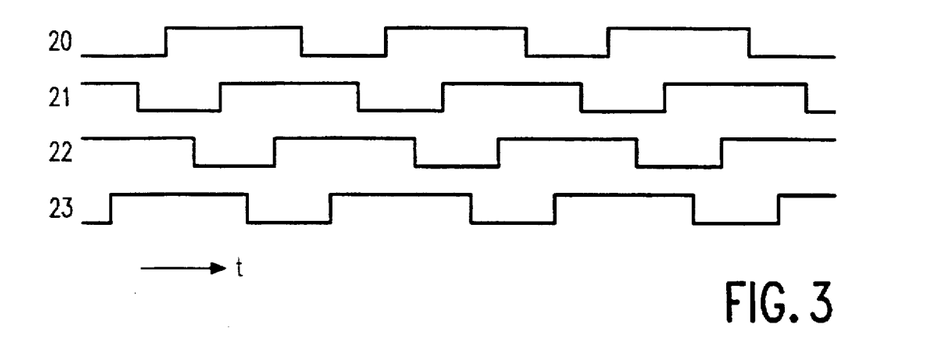
FIG. 3 is a diagram of 4-phase clock voltages with which the device of FIGS. 1 and 2 is operated.
Figure 5:
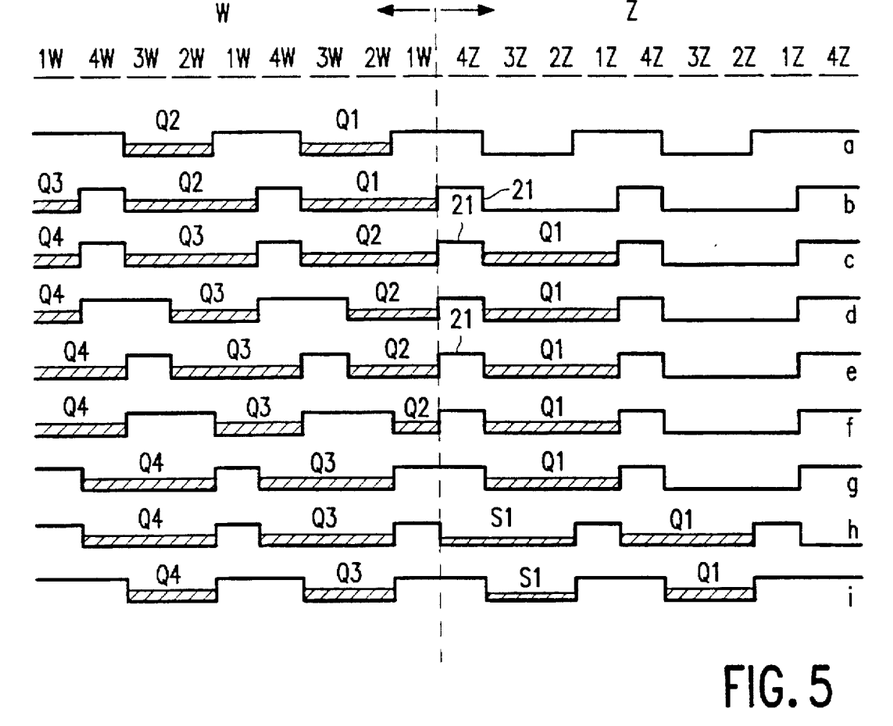
FIG. 5 shows a number of potential profiles which occur in the receiving matrix at various points in time.

FIG. 5 shows a number of potential profiles formed below the electrodes in segments W and Z with the use of the four-phase clocks of FIG. 3. The left-hand part of the drawing represents a portion of segment W; the right-hand part of the Figure represents an adjoining portion of segment Z. The potential is plotted in downward direction; the hatched portions Q represent charge packets, Q1 being a charge packet from line "1", Q2 a charge packet from line "2", etc. S1 is a charge packet with smear charge. FIG. 5a shows the situation in which segment Z is empty and a pattern of charge packets is stored in potential wells in segment W. The segments W and Z are clocked simultaneously and in phase with one another. In FIG. 5b, a situation is obtained corresponding to the situation shown in FIG. 4a. FIG. 5c shows the situation corresponding to FIG. 4b, where the charge packet Q1 is stored in segment Z. The clock voltages of segment Z are then stopped, where it should be noted that a potential barrier has been formed below the electrode 4Z situated at the boundary between the segments W and Z. The charge transport in segment W is continued as shown in FIGS. 5d, 5e and 5f. Owing to the potential barrier 24, the charge packet Q2 cannot be transported further but is drained off through the substrate when at last the potential well below the associated electrode 1 W disappears (FIG. 5g). This mechanism is diagrammatically depicted in FIG. 6. In this diagram, the potential is plotted in the y-direction and the distance or depth from the surface in the x-direction. The various regions are indicated with reference numerals in the drawing. Curve A represents the potential profile for a positive voltage at the gate electrode. A potential well in which a charge packet, shown hatched, can be stored is formed in layer 12. When the voltage at the gate electrode is reduced, curve B is obtained. The charge packet now flows through the p-type layer 13 to the substrate 14 which is at a positive voltage, as indicated with arrow 25. When the situation of FIG. 5g is reached, the clock voltages can be stopped in segment W, and the gate electrodes of segment Z are clocked. The charge packet $Q_1$ has been transported further over a distance of one pixel, i.e. four electrodes, at the moment shown in FIG. 5h. Simultaneously, the smear packet $S_1$ is formed in segment Z at the area of the first pixel. Then the two segments can be clocked again (FIG. 5i) so as to transport the packet $Q_3$ to segment Z.

The charge pattern can thus be transferred very quickly from segment W into segment Z which is used as the memory and from which the image lines and the smear lines are read out via the horizontal read-out register. During the read-out, a fresh image may be received in segment W again. After the read-out of the charge packets, the signals obtained thereby may be converted by an ADC, for example, into a 12-bit digital signal and be stored in a RAM. Then the smear components may be subtracted from the video signals by a suitable signal processor, after which the compensated video information thus obtained may be stored in a RAM again, if so desired, and converted into an analog video signal by a DAC.

In a specific embodiment, the number of vertical columns was slightly more than 3,000 and the number of horizontal lines slightly more than 2,000. The vertical transport frequency and the horizontal transport frequency were 200 kHz and 36 MHz, respectively. Reading-out of one line in segment Z then takes:

$$1567 \times 1/36.10^6 + 7 \, \mu sec. = 50.5 \, \mu s$$

Reading-out of the segment Z (signal lines+smear lines) then takes: 1024×50.5=51.7 ms. This time then also is the maximum integration time for a new image. The smear charge formed from the moment the smear line is formed in segment Z can be subtracted from the signal. The vertical transport of all lines from segment W to segment Z takes $(1024+512) \times 1/200.10^3 = 7.68$ ms, where 1024 is the number of lines in segment W and 512 the number of smear lines formed. It can be calculated from this that the smear suppression is 36.6 dB. This is found to be amply sufficient for many practical applications. The frame rate is: 1000/(51.7+7.68)=16.8 images per second. This number is often sufficient already in practice. Sometimes 10 images per second will suffice. In that case, it is possible to achieve a smear suppression of approximately 42 dB.

Figure 7:
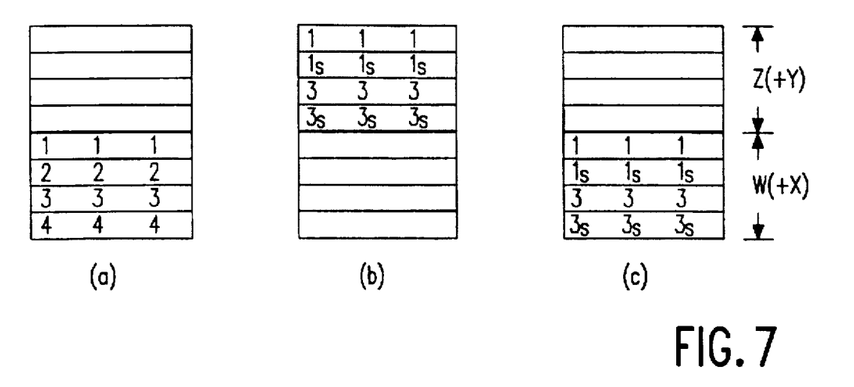
FIG. 7 shows a modification of the method of FIG. 4.

It is possible in this manner to represent the image information of one quadrant on a display device in a satisfactory manner. In a similar manner, the image received in, for example, the lower half of the matrix formed by quadrants W and X may be treated, while the upper half of the matrix with quadrants Y and Z is used as the memory. It is also possible to display a complete picture received in the four quadrants real-time by means of a modification of the method described above. As in FIG. 4, the upper half of each of the drawings a, b and c represents the quadrant Z or W or the upper matrix half Z+Y, and the lower half of the drawings the quadrant W or X or the lower matrix half W+X. FIG. 7 further uses the same reference symbols as FIG. 4. FIG. 7a shows the situation corresponding to FIG. 4a, where an image is received in the lower half. FIG. 7b shows the situation where half of the lines of FIG. 7a have been stored in the upper half, and smear lines have been formed between the signal lines. The pattern of charge packets is not read out now via the serial register 4a, 4b at the upper side of the matrix, but is returned to the lower matrix half through reversal of the clock voltages as shown in FIG. 7c. Any smear charge still present in the upper matrix half after that may be drained off through the substrate, if so desired, for example by means of a negative voltage applied to the electrodes. The upper matrix half is empty then and ready for converting an image projected thereof into electric charge during an integration period. During this integration period, the pattern of charge packets present in the lower matrix half, which now acts as the memory, can be read out line by line through the adjoining read-out register 3a, 3b. After said integration period, half of the lines of the upper matrix half can be stored in the lower matrix half, while the other half are drained off, so that smear lines are formed between the signal lines. This entire pattern can subsequently be transported to the upper half again so as to be read out through read-out registers 4a, 4b line by line, while a fresh image is converted in the lower matrix half again.

Figure 6:
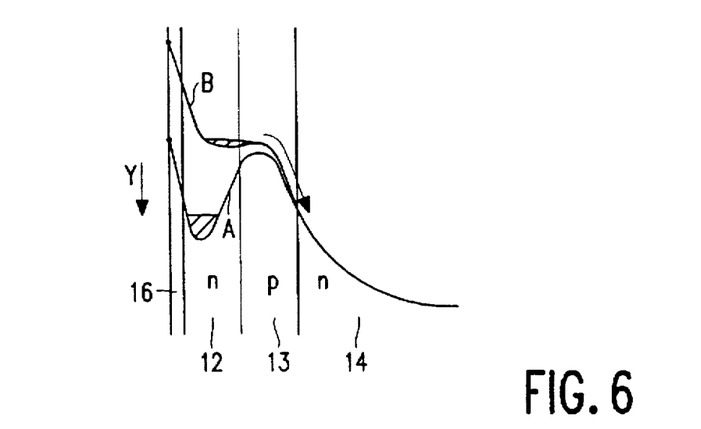
FIG. 6 shows the potential profile in this imager for two different voltages applied to the gate electrode.

It is evident from the diagram of FIG. 6, curve A, that, when the charge packet stored in the potential well and possibly composed of signal charge and smear charge has reached a certain value, charge carriers will flow across the barrier in the p-type region 13 to the substrate upon a further increase in the charge. The charge packet will thus not increase in size anymore, so that, for example, the blooming effect caused by overexposure can be prevented. The use of the compensation method described above may give rise to problems when the signal has indeed reached its maximum value, and the smear charge can become greater than the smear charge added to the signal. This problem can be counteracted at least to a major degree in that the positive voltage level of the clock voltages, i.e. the voltage level of the electrodes below which the charge is stored, is chosen to be higher during transport than during the integration period. To choose suitable voltage levels, it is possible to choose the voltage on the integrating electrodes during the integration period such that the maximum charge packet of the signal is adapted to the dynamic range of, for example, the LCD device. In practice, a maximum of approximately $50.10^3$ electrons is found to be sufficient for the charge packet, which corresponds to a voltage of approximately 5 V. The positive clock voltage level is raised to, for example, 10 V during transport, which corresponds to a charge maximum of approximately $200.10^3$ electrons per packet. If the read-out time is equal or at least practically equal to the integration time, as described above, the quantity of smear charge caught per charge packet will usually be smaller than $150.10^3$ electrons, so that the problem identified above is avoided practically entirely.

Figure 8:
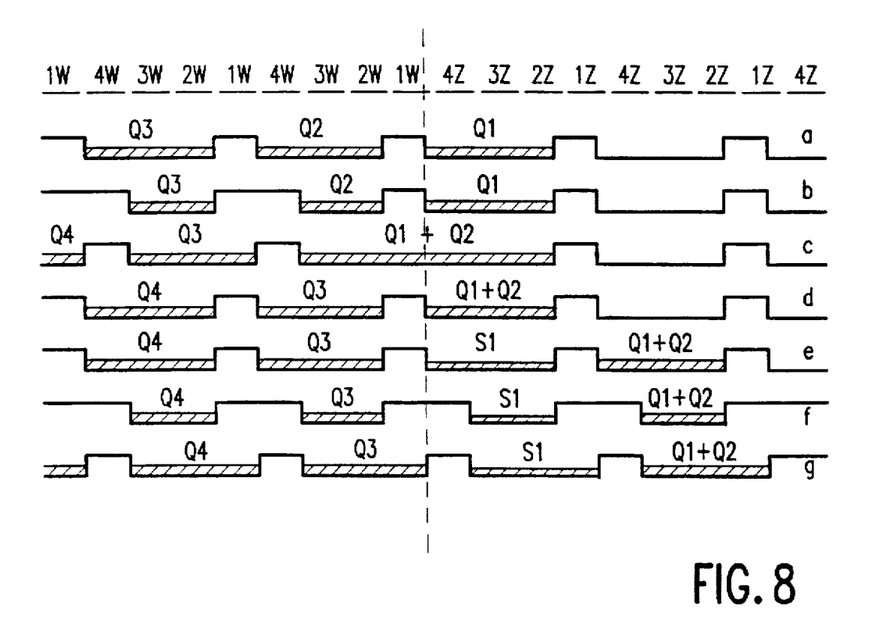
FIG. 8 shows several steps in a further embodiment of a method of operating the device of FIGS. 1 and 2.

In the embodiments described hitherto, an empty line was formed between lines containing video information for determining the smear charge, which empty line was obtained through the removal of a line containing video information to the substrate. Such an empty line may alternatively be obtained in that two or more consecutive lines are joined together, as diagrammatically shown in FIG. 8. This drawing indicates potential profiles below gate electrodes of segment W and segment Z in the same manner as in the diagram of FIG. 4. The figure in front of the letters W and Z represents the phase. It is again assumed that an image has been converted into a pattern of electric charges during an integration time in segment W, and that the video information obtained is stored in segment Z. First the segments W and Z are clocked synchronously until the first line, represented by charge packet Q1, is stored in segment Z, see FIG. 8a. The clock voltages of segment Z are stopped then, while the charge packets are further transported in W in the direction of Z, see FIG. 8b. At a certain moment the situation is reached where the packets Q1 and Q2 are no longer separated by a potential barrier, but form a single charge packet indicated with Q1+Q2 in the drawing, see FIG. 8c. The clock voltages of segment W are then stopped at a suitable moment (FIG. 8d), and the charge packet Q1+Q2 is transported further over a distance of one pixel in segment Z, see FIG. 8e. An empty potential well remains in the location left by this packet, and this is where the smear charge S1 is formed. From that moment the segments W and Z can be operated synchronously again, see FIGS. 8f and 8g, until the charge packet Q3 has arrived in segment Z where it will be added to Q4 in the manner described above. Further information processing may take place in a similar manner as in the preceding embodiment.

It will be apparent that the invention is not limited to the embodiments given here, but that many more variations are possible to those skilled in the art within the scope of the invention. Thus it is possible in a modification of the first embodiment that two or more lines are drained off through the substrate instead of a single line between two lines which are read out. Such a method may be used to advantage, for example, in situations where a high frame rate is required.

The matrix in the embodiments described is provided with read-out registers on both sides. The invention, however, may also be advantageously used in imagers with a read-out register on one side only. The imager matrix may alternatively be of the interline type, where the photosensitive elements are formed by photodiodes arranged in columns between which vertical CCD registers are provided which serve for information transport only.

What is claimed is:

1. A method of operating a CCD imager with a semiconductor body comprising a matrix of photosensitive elements arranged in rows and columns, and a system of CCD channels which extend in the matrix in the column direction and at at least one of the ends merge into a read-out register which extends adjacent the matrix parallel to the rows of the matrix, the matrix being divided at least in the column direction into two at least substantially equal segments which are each provided with a separately controllable system of electrodes for storing and transporting charge packets in said CCD channels, comprising, during an integration period, capturing an electromagnetic image and converting said image into electric charge by one of said segments of the matrix, called first matrix segment, and after the integration period transporting said charge to the other segment of the matrix, called second matrix segment, which is temporarily used as a memory in which the electric charge is stored in the form of charge packets before being read out row by row through a read-out register, forming at least one additional row of charge packets containing exclusively electric charge integrated during the charge transport from the transition between the first to the second matrix segment to the transition to said read-out register, reducing each of said former charge packets by a quantity of charge which serves as a compensation for the smear charge captured after the integration period, and forming an empty row for the formation of this additional row through the transport of charge into the second matrix segment over a distance of one row while the charge in the first matrix segment is not transported further.

2. A method as claimed in claim 1, characterized in that said charge coupled device is of the buried channel type, comprising providing charge transport channels in said CCD in the form of zones of a first conductivity type which are situated at or adjacent the surface of the semiconductor body and which are bounded at the side away from the surface by a region of the opposed, second conductivity type which separates the charge transport channels from a subjacent substrate region of the first conductivity type.

3. A method as claimed in claim 2, characterized in that, in the formation of an additional row during transport from the first matrix segment to the second matrix segment, comprising draining off charge packets in a row of charge packets generated in the first matrix segment during the integration period through a charge drain so that the total number of rows is not increased by the formation of the additional row.

4. A method as claimed in claim 3, comprising draining off charge packets formed in the first matrix half through the substrate region.

5. A method as claimed in claim 4, comprising draining off said rows of charge packets by applying voltages to a first electrode of the first matrix segment and an adjoining second electrode of the second matrix segment, the boundary between the first and the second matrix segment being situated between said first and said second electrode, which voltages are such that below the first electrode potential wells are formed which are bounded by potential barriers formed below the second electrode, a row of charge packets being stored in said potential wells, then changing the voltage applied to the first electrode such that a potential barrier is induced also below the first electrode while the potential barrier below the second electrode is maintained, so that the charge stored below the first electrode flows to the substrate region.

6. A method as claimed in claim 1, charactertized in that, in the formation of an additional row during transport from the first matrix segment to the second matrix segment, comprising draining off charge packets in a row of charge packets generated in the first matrix segment during the integration period through a charge drain so that the total number of rows is not increased by the formation of the additional row.

7. A method as claimed in claim 1, comprising, when an empty row is formed at the transition between the first and the second matrix segment, adding together at least two consecutive rows of charge packets formed in the first matrix segment during said integration period.

8. A method as claimed in claim 1, comprising reading out the rows of charge packets row by row by the read-out register belonging to the second matrix segment after transporting said charge packets from the first matrix segment into the second matrix segment, and receiving a fresh electromagnetic image in the first matrix segment and converting said fresh electromagnetic image into electric charge.

9. A method as claimed in claim 1, comprising using a matrix with a read-out register at both ends, transporting the rows of charge packets from the first matrix segment into the second matrix segment, then transporting the rows of charge packets to the first matrix segment together with the additional rows formed and reading out row by row from the first matrix segment by the associated read-out register, while receiving an electromagnetic image in the second matrix segment and converting said electromagnetic image into a pattern of electric charges.

10. A method as claimed in claim 9, comprising during the charge transport from the first matrix segment into the second matrix segment, reducing the number of rows containing video information such that the resulting total number of rows of charge packets stored in the first matrix segment is smaller than the total number of rows containing video information formed in the first matrix segment during the integration period.

11. A method as claimed in claim 1, comprising applying different voltages to the electrodes below which charge is stored after the integration period and during the integration period, such that a greater charge packet can be stored below these electrodes after the integration period than during the integration period.

12. A CCD imager with a semiconductor body comprising a matrix of photosensitive elements arranged in rows and columns, and a system of CCD channels which extend in the matrix in the column direction and at at least one of the ends merge into a read-out register which extends adjacent the matrix parallel to the rows of the matrix, the matrix being divided at least in the column direction into two at least substantially equal segments which are each provided with a separately controllable system of electrodes for storing and transporting charge packets in said CCD channels, characterized in that means are present for receiving an electromagnetic image during an integration period and converting it into electric charge by means of one of said segments of the matrix, called first matrix segment, and for transporting this charge to the other segment of the matrix, called second matrix segment, after the integration period, which second matrix segment is temporarily used as a memory in which the electric charge is stored in the form of charge packets before being read out row by row by a read-out register, while furthermore means are present for subtracting from each of these charge packets a quantity of charge by way of compensation for the smear charge captured after the integration period, for forming at least one additional row of charge packets which contains exclusively electric charge integrated during the charge transport from the transition between the first and the second matrix segment to the transition to said read-out register, and for forming an empty row for the formation of this additional row through the transport of charge in the second matrix segment over a distance of one row while the charge in the first matrix segment is not transported further.

13. A CCD imager as claimed in claim 12, characterized in that the charge coupled device is of the buried channel type and comprises charge transport channels in the form of zones of a first conductivity type which are situated at or adjacent the surface of the semiconductor body and which are bounded at the side away from the surface by a region of the opposed, second conductivity type which separates the charge transport channels from a subjacent substrate region of the first conductivity type.

14. A CCD imager as claimed in claim 13, characterized in that means are present for draining off charge packets in a row of charge packets generated in the first matrix segment during the integration period via a charge drain during the formation of an additional row during the transport from the first matrix segment to the second matrix segment, so that the total number of rows is not increased by the formation of the additional row.

15. A CCD imager as claimed in claim 14, characterized in that said charge drain comprises the substrate region of the first conductivity type.

16. A CCD imager as claimed in claim 15, characterized in that, for the purpose of draining off said rows of charge packets, discharge control voltage means are present for applying voltages to a first electrode of the first matrix segment and to an adjoining second electrode of the second matrix segment, the boundary between the first and the second matrix segment being situated between said first and said second electrode, which voltages are such that below the first electrode potential wells are formed which are bounded by potential barriers formed below the second electrode, a row of charge packets being stored in said potential wells, and for changing the voltage applied to the first electrode subsequently such that a potential barrier is induced also below the first electrode, while the potential barrier below the second electrode is maintained, so that the charge stored below the first electrode flows to the substrate region.

17. A CCD imager as claimed in claim 12, characterized in that means are present for draining off charge packets in a row of charge packets generated in the first matrix segment during the integration period via a charge drain during the formation of an additional row during the transport from the first matrix segment to the second matrix segment, so that the total number of rows is not increased by the formation of the additional row.

18. A CCD imager as claimed in claim 12, characterized in that means are present for joining together at least two consecutive rows of charge packets, which packets were formed in the first matrix segment during said integration period, during the formation of the additional row at the boundary between the first and the second matrix segment.

19. A CCD imager as claimed in claim 12, characterized in that means are present for reading out the rows of charge packets one by one via the read-out register associated with the second matrix segment after said packets were transported from the first matrix segment to the second matrix segment, while a fresh electromagnetic image is received in the first matrix segment and converted into electric charge.

20. A CCD imager as claimed in claim 12, in which the matrix is provided with a read-out register at both ends, characterized in that means are present for transporting the rows of charge packets, after the latter have been transported from the first matrix segment to the second matrix segment, together with the additional rows formed to the first matrix segment, and for reading them out row by row from the first matrix segment via the associated read-out register, while an electromagnetic image is received in the second matrix segment and converted into a pattern of electric charge.

21. A CCD imager as claimed in claim 12, characterized in that means are present for applying different voltages to the electrodes below which charge is stored after the integration period and during the integration period, such that a greater charge packet can be stored below these electrodes after the integration period than during the integration period.

* * * * *